United States Patent [19]

Duncan

[11] 4,406,383

[45] Sep. 27, 1983

[54] HIGH PRESSURE WATER GUN

[76] Inventor: Gordon Duncan, 1505 Park Blvd., West Sacramento, Calif. 95691

[21] Appl. No.: 286,595

[22] Filed: Jul. 24, 1981

[51] Int. Cl.³ .......................................... F16K 31/143

[52] U.S. Cl. ....................................... 222/495; 251/44

[58] Field of Search .................. 251/44; 222/559, 495; 239/526, 528; 134/172, 198

[56] References Cited

U.S. PATENT DOCUMENTS 1,651,689 12/1927 Freeze .................................. 251/44

2,758,811 8/1956 Peterson .......................... 251/44 X

*Primary Examiner*—Stanley H. Tollberg

*Attorney, Agent, or Firm*—Mark C. Jacobs

[57] ABSTRACT

A water gun having a barrel, a water inlet, a pistol grip and and a main body portion with an upper piston chamber in the main body portion communicating with the inlet and a lower valve chamber separated from the upper piston chamber. A piston is slidably mounted in the upper chamber and has an upper land engaging the inner wall of the upper chamber in non-sealing relationship and a lower land engaging the inner wall of the upper chamber in sealing relationship. A valve is slidably mounted in the lower chamber and includes a pair of spaced lands in sealing engagement with the inner wall of said lower chamber normally disposed on both sides of a port in a wall separating the upper chamber from the lower chamber when the gun is in inoperative position. A port also extends through the lower land and communicates the port in the wall with the area in the upper chamber above the lower land. A port in the body portion communicates the barrel with the lower chamber. The relationship between the ports, the piston and the valve pressure balances the gun so that water introduced under high pressure into the inlet ejects out of the nozzle with relatively little pull required on the trigger.

10 Claims, 4 Drawing Figures

HIGH PRESSURE WATER GUN

BACKGROUND OF THE INVENTION

1. Field of the Invention

The invention relates to high pressure water guns; and, more particularly, to guns that eject water under high pressure to clean insulators of utility power lines or the like.

2. Description of the Prior Art

High pressure water guns are known in the art for ejecting a stream of water under relatively high pressure for cleaning various items, such as insulators of utility power lines or the like. Generally, such guns require a considerable amount of pull, such as 60 pounds, to operate the same. These guns are operated by coupling the same to a high pressure water pump, such as a fire pump. Prior art guns require all one's strength to operate and both hands are required. These prior art guns are also relatively complicated, have many moving parts and require periodic servicing and replacing. In fact, many such guns, although relatively expensive, only last about six months out in the field and then have to be discarded.

There is thus a need for a water gun for cleaning insulators which requires relatively light pressure to operate, can be operated with one hand, is simple and easy to manufacture and has a long life with replaceable parts.

SUMMARY OF THE INVENTION

An object of this invention therefore, is to provide an improved wash gun for use by the utility companies among others.

Another object is to provide a wash gun for cleaning electrical insulators that will operate under the application of normal hand pressure.

Still another object is to provide a long lasting water wash gun that can withstand physical abuse during normal useage.

It is also an object of this invention to provide a water gun that ejects water under high pressure with relatively light operating pressure.

A yet further object of this invention is to provide a water gun which can be operated with one hand to deliver water under pressure.

It is still another object of this invention to provide a high pressure water gun for cleaning insulators or the like which is simple to manufacture, has a relatively long life and has replaceable parts.

These and other objects will in part appear herein, and will in part be discernible from the specification and the appended claims.

These and other objects of the invention are preferably accomplished by providing a water gun having a barrel, a water inlet, a pistol grip and a main body portion with an upper piston chamber in the main body portion communicating with the inlet and a lower valve chamber separated from the upper piston chamber. A piston is slidably mounted in the upper chamber and has an upper land engaging the inner wall of the upper chamber in non-sealing relationship and a lower land engaging the inner wall of the upper chamber in sealing relationship. A valve is slidably mounted in the lower chamber and includes a pair of spaced lands in sealing engagement with the inner wall of said lower chamber normally disposed on both sides of a port in a wall separating the upper chamber from the lower chamber when the gun is in inoperative position. A port also extends through the lower land and communicates the port in the wall with the area in the upper chamber above the lower land. A port in the body portion communicates the barrel with the lower chamber. The relationship between the Ports, the piston and the valve pressure balances the gun so that water introduced under high pressure into the inlet ejects out of the nozzle with relatively little pull required on the trigger.

DESCRIPTION OF THE PREFERRED EMBODIMENT

Figure 1:
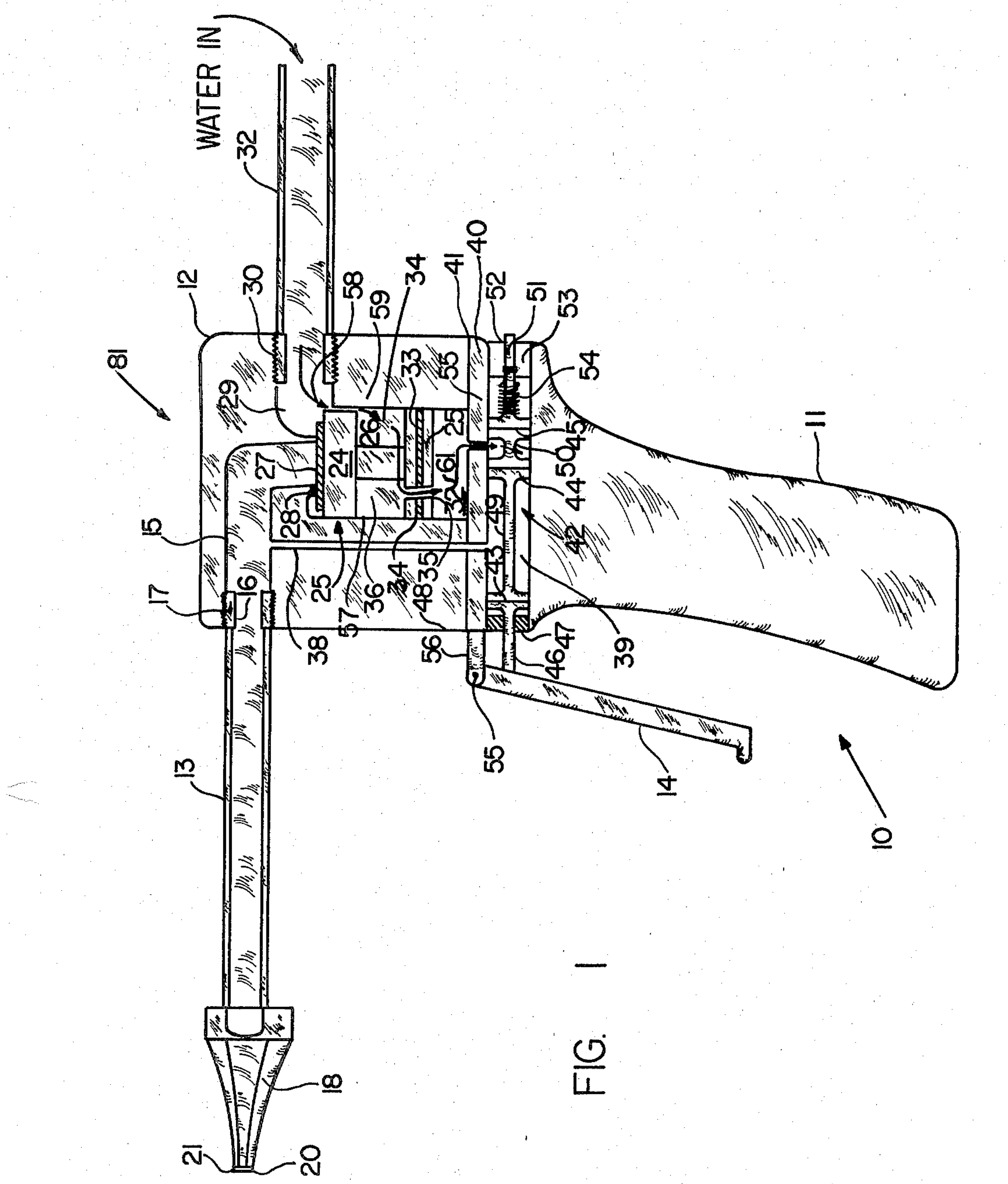
FIG. 1 is a vertical sectional view of a water gun in accordance with the teachings of the invention in its inoperative position; and, FIG. 2 is a vertical sectional view similar to FIG. 1 showing the gun in operating position.

Referring now to FIG. 1 of the invention, a water gun 10 is shown having a pistol grip 11, a main body portion 12 coupled to grip 11 and a barrel portion 13 extending away from body portion 12 and coupled thereto. A trigger 14 is coupled to pistol grip 11 for actuating the same as will be discussed.

Main body portion 12 houses the operating mechanism of gun 10 and includes an L-shaped passageway or port 15 in fluid communication at one end with barrel portion 13. As seen in FIG. 1, barrel portion 13 may include a threaded end 16 adapted to mate with like threads 17 on the interior of port 15. The engagement of end 16 with threads 17 may be fluid tight and this arrangement provides for a flow of fluid from port 15, through barrel portion 13 and out a nozzle 18 mounted at the terminal end of barrel portion 43. Nozzle 18 may be removably secured to barrel portion 13, such as snap fitting thereon, preferably threaded thereto, or permanently secured thereto. Nozzle 18 may be shaped as indicated by the shape of the inner wall to provide a restricted opening 20 at end 21 and may be aluminum with an inner stainless steel wall.

Port 15 opens into an enlarged inner chamber 22 internally of body portion 12 and an H-shaped piston 23, having an upper land 24, a lower land 25 and an interconnecting shaft portion 26, is slidably mounted in chamber 22. A seat 27, of Teflon or the like, is fixedly secured to the upper surface of upper land 24 where port 15 opens into chamber 22 and, in the FIG. 1 position, seals off the piston valve seat 28 as shown.

A passageway 29 fluidly communicates the portion of chamber 22 above upper land 24 (FIG. 1 position) with the exterior of gun 10 and may have a threaded wall portion 30 adapted to receive therein the threaded end 31 of a tubing 32 or the like leading to a pressurized source of fluid, such as water (not shown). For example, tubing 32 may be coupled to a conventional fire pump (not shown). A sample piston ring of Delron material 33 may be provided in a peripheral groove 34 on lower land 25 and a pilot port 35 extends through lower land 25 fluidly communicating the area 36 in chamber 22 about interconnecting portion 26 with the area 37 in chamber 22 below lower land 25. A secondary pilot port 38 extends vertically through body portion 12 fluidly interconnecting port 15 with a secondary chamber 39 in pistol grip 11 below chamber 22 and separated therefrom by partition wall 40.

The primary pilot port 41 in wall 40 fluidly communicates chambers 22 and 39. A pressure balanced spool valve 42 is slidably mounted in lower or secondary chamber 39 and is comprised of a first spool land 43, a second spool land 44 and a third spool land 45. A first extension portion 46 extends from first spool land 43, through an aperture 47 in wall 48 (closing off chamber 39) and out of gun 10 until it abuts against trigger 14 as shown. First and second lands 43 and 44 are interconnected by member 49, second and third lands 44 and 45 are interconnected by member 50, and an extension portion 51 extends from third land 45 and into a suitable aperture 52 in wall 53 closing off the other end of chamber 39. Both extension portions 46 and 51 are slidably mounted in their respective apertures and a coil spring 54 surrounds that portion of extension portion 51 between third land 45 and wall 53 normally biasing spool valve 42 to the FIG. 1 position within chamber 39. Finally, conventional O-rings 55 are mounted in suitable peripheral grooves in each land 43 through 45.

As shown in FIG. 1, trigger 14 is pivotally connected, via pivot pin 55, to an extension portion 56 leading from wall 40. Trigger 14 thus abuts against extension portion 46 in the normal non-operating position of gun 10.

The operation of gun 10 will now be described with particular reference to FIG. 1. Water pressure from a remote source is fed into gun 10 via tubing 32. With trigger 14 in the released position shown in FIG. 1, and valve 42 also in the FIG. 1 position, the water flows between the outer wall of upper piston land 24 and the inner wall 57 of piston chamber 22 as indicated by arrows 58 and 59. Since no seal is provided between land 24 and wall 57, the ater then flows out of port 35, as indicated by arrow 60, below lower land 25, then through the primary pilot port 41 onto spool valve 42 as indicated by arrow 61.

The flow of the fluid is then stopped between spool lands 44 and 45 causing a pressure build up on the bottom side of the lower piston land 25 which thus pushes piston 23 upwardly and seals off the "out" port 15 when seat 27 closes off seat 28. This stops any water flow from exiting out of nozzle 18.

Figure 2:
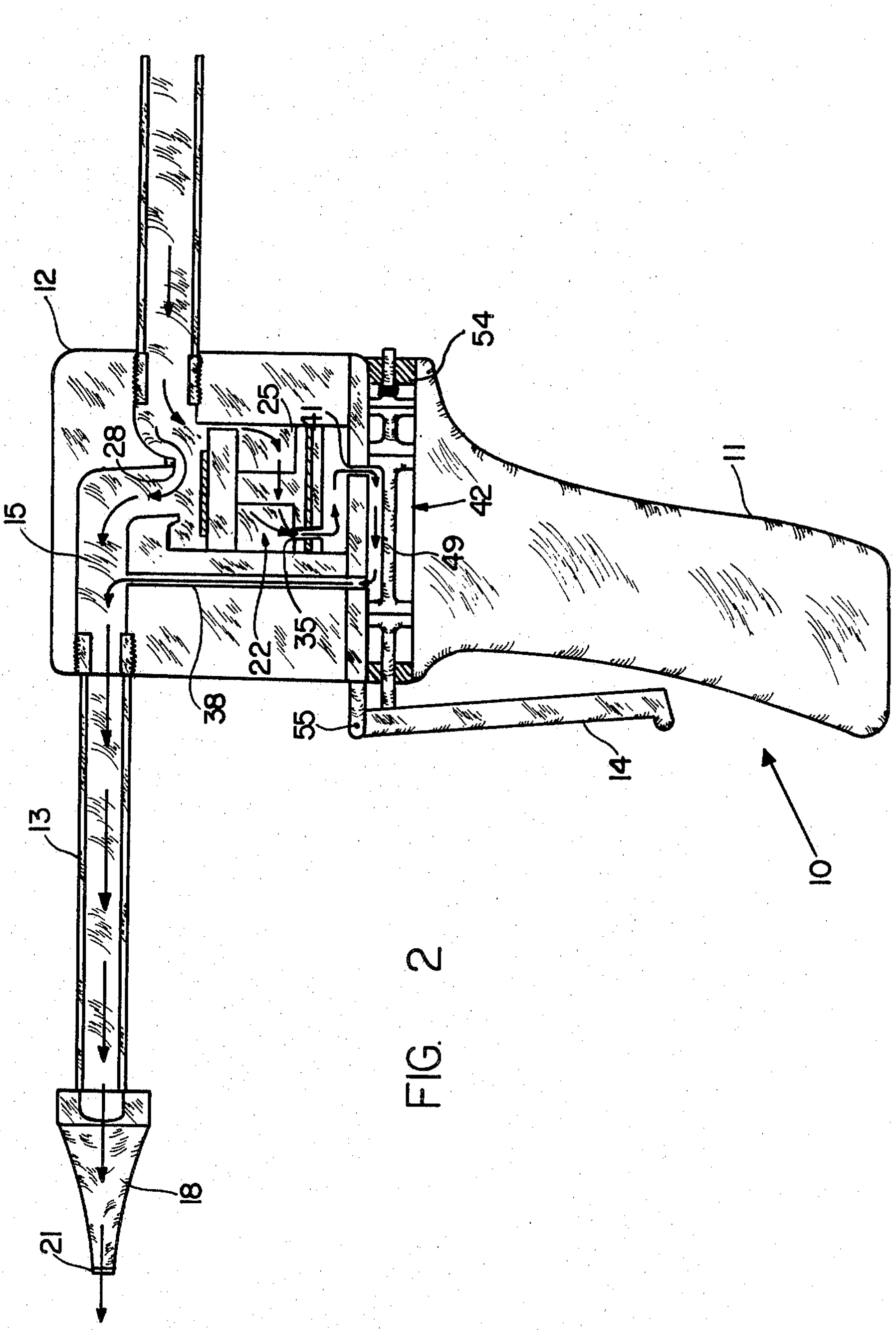

As shown in FIG. 2, squeezing of trigger 14 pivots trigger 14 about pin 55 moving spool valve 42 to the right in FIG. 1 opening port 41 so that fluid flow passes along member 49 and up port 38, which acts as a vent, and out of port 15 as indicated by arrow 62. This relieves pressure on the underside of lower piston land 25 since port 41 is larger than port 35, permitting piston 23 to move downwardly away from engagement with seat 28 as shown in FIG. 2. Fluid from tubing 32 thus also passes about seat 28 and out of port 15 through nozzle 18. Of course, release of trigger 14 returns it to the FIG. 1 position due to the biasing action of spring 54 thus once again sealing off the out port 15 as previously described.

The foregoing has described a water gun having an even pull so that it can be operated with one hand with finger tip pressure rather than the high pull required in the past. The various seals and O-rings may be quickly and easily replaced when worn on the gun 10, having relatively few moving parts, is durable and long lasting. Stainless steel or the like may be used in the internal mechanisms to add to the longevity of gun 10. Of course, any suitable materials, such as metals, high impact plastics, etc. may be used.

Regardless of what pressure is applied, the pull on trigger 14 remains on the same due to the pressure balance of gun 10. There is an equal amount of push on lands 43, 44 and 45 of the trigger.

There is less operator fatigue when using the gun due to its pressure balance. The gun 10 may be easily manufactured and essentially has only two moving parts, the piston 23 and valve 2. The body portion 12 may be secured to handle 11 in any suitable manner and may comprise removable sections screwed together for easy access to the interior.

The size of openings or ports 35, 41 and 38 and the area of buildup on the various parts are selected so that fluid will not enter gun 10 as fast as it exits. Thus it must be understood that primary port 41 must be of greater cross sectional area than the piston pilot port. This ensures no back pressure buildup in undesired locations. Thus when the trigger is in the operative position, more water drains through the trigger spool valve and out the secondary port 38 than is flowing through the piston port.

Another key design objective was to permit flow around the top land of the piston. If the land fits too tightly then a pressure would build up in the area of 30 and no pressure would build up under piston land 25 to push piston closed, thus forcing the piston down when it was supposed to be up and closed.

As to the secondary piston post 38 this should be of the same or greater magnitude than the primary pilot port 41. This is to ensure no back pressures buildup.

On one embodiment I constructed, I provided for a primary pilot port approximately 25% larger in cross sectional area than that of the piston port. I also provided an inlet diameter equal to the outlet tube diameter, namely 0.75".

In a test procedure run by a major California utility it was found that due to the overall balance of the gun of this invention, that even when throughput was at 60 gallons of water per minute levels that upon shut off, the shock load on the input hoses was significantly less than that suffered when current state of the art guns are shut off. Thus there will be fewer burst hoses with this device.

Figure 3:
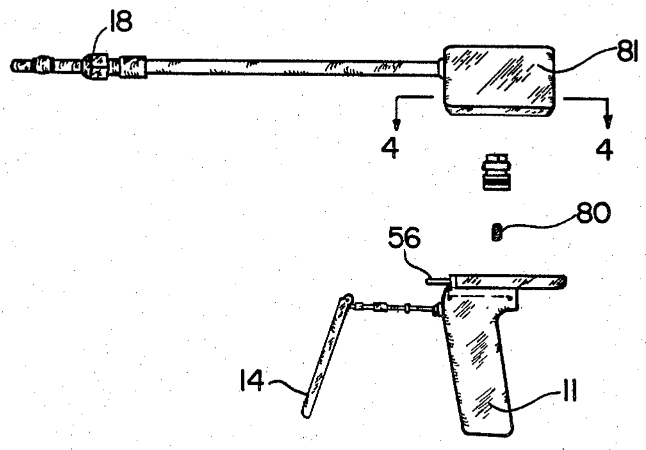
FIG. 3 is an exploded elevational view of the device of FIG. 1.
Figure 4:
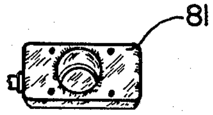
FIG. 4 is a bottom plan view taken along the line 4—4 of FIG. 3.

FIGS. 3 and 4 are added to show the modular construction of the wash gun of this invention, which makes repair if ever necessary, quite simple. In FIG. 3 there is shown a coil spring 80, which may be optionally employed to increase the closing rate of the piston. However its use is not required.

As seen in FIG. 4, the piston block assembly 81, which includes all of the components described with respect to FIGS. 1 and 2, is easily bolted to pistol grip 11 by bolts not shown.

Since certain changes may be made in the above apparatus without departing from the scope of the invention herein, it is intended that all matter contained herein shall be interpreted as illustrative and not as limiting.

I claim:

1. A water gun for delivering water under high pressure comprising:

a grip;

a main body portion having an upper inner piston chamber separated by a lower inner piston chamber coupled to said grip;

a water inlet leading into said upper chamber;

a water outlet leading out of said upper chamber;

a piston having an upper land interconnected by a shaft to a lower land slidably mounted in said upper chamber, said upper land having a valve seat adapted to close off said water outlet when said piston is in its upper position, said lower land sealingly engaging the inner wall of said upper chamber and said upper land being in non-sealing engagement with the inner wall of said upper chamber so that fluid flow from said inlet can enter said gun above said upper land and flow between said upper land and the inner wall of said upper chamber;

a port extending through said lower land;

said upper chamber being separated from said lower chamber by a wall having a port therein fluidly interconnecting said lower chamber with said upper chamber;

a port extending through said main body portion fluidly interconnecting said outlet with said lower chamber; and a valve slidably mounted in said lower chamber having a plurality of spaced valve lands sealingly engaging the inner wall of said lower chamber, at least two of said valve lands being disposed in said lower chamber on both sides of said port in said wall when said gun is in its operative position whereby fluid entering said lower chamber from said upper chamber flows between said valve lands said at least two of said valve lands and is sealed off from the remaining portion of said inner chamber.

2. In the gun of claim 1 including a trigger pivotally mounted on said gun engaging said valve for moving said valve to a position whereby said at least two of said valve lands unseal said port in said wall so that fluid flows into said lower chamber, up said port in said body position and out said water outlet.

3. In the gun of claim 2 including a third valve land on said valve spaced from said at least two valve lands sealingly engaging the inner wall of said lower chamber between said port in said body portion and said trigger.

4. In the gun of claim 3 including a spring normally biasing said valve to the position where said at least two valve lands seal off said port in said wall.

5. In the gun of claim 1 including a Teflon seal on said upper land valve seat of said upper land adapted to seat off.

6. In the gun of claim 1 wherein said water outlet is an elongated hollow barrel coupled to said main body portion.

7. In the gun of claim 6 wherein said barrel terminates in a nozzle having a restricted opening.

8. In the gun of claim 6 wherein said barrel is removably secured to said body portion.

9. In the gun of claim 1 wherein the second mentioned port is of a larger cross sectional area than the first mentioned port.

10. In the gun of claim 9 wherein the cross sectional area ratio is about 1.25:1.

* * * * *